United States Patent
Jin

(10) Patent No.: US 9,355,272 B2
(45) Date of Patent: May 31, 2016

(54) COMPUTING SYSTEM WITH PRIVACY MECHANISM AND METHOD OF OPERATION THEREOF

(71) Applicant: Samsung Electronics Co., Ltd., Gyeonggi-Do (KR)

(72) Inventor: Hongxia Jin, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 190 days.

(21) Appl. No.: 14/010,331

(22) Filed: Aug. 26, 2013

(65) Prior Publication Data

US 2014/0283101 A1 Sep. 18, 2014

Related U.S. Application Data

(60) Provisional application No. 61/790,466, filed on Mar. 15, 2013.

(51) Int. Cl.
*G06F 21/62* (2013.01)
*G06Q 10/00* (2012.01)

(52) U.S. Cl.
CPC .......... *G06F 21/6245* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 7,599,918 B2 | 10/2009 | Shen et al. | |
| 8,606,746 B2* | 12/2013 | Yeap | G06F 21/6245 707/603 |
| 8,832,567 B1* | 9/2014 | Jing et al. | 715/753 |
| 2007/0210937 A1 | 9/2007 | Smith et al. | |
| 2011/0154223 A1 | 6/2011 | Whitnah et al. | |
| 2012/0084362 A1* | 4/2012 | McBrearty | G06Q 30/0269 709/204 |
| 2012/0110474 A1 | 5/2012 | Chen et al. | |
| 2012/0159334 A1 | 6/2012 | Messerly et al. | |
| 2012/0216296 A1 | 8/2012 | Kidron | |
| 2012/0260188 A1 | 10/2012 | Park et al. | |
| 2012/0311030 A1 | 12/2012 | Lin et al. | |
| 2012/0311131 A1* | 12/2012 | Arrasvuori | 709/224 |
| 2012/0317652 A1* | 12/2012 | Kiley et al. | 726/27 |
| 2012/0331567 A1* | 12/2012 | Shelton | 726/28 |
| 2014/0283087 A1* | 9/2014 | Poornachandran et al. | 726/26 |
| 2015/0013016 A1* | 1/2015 | Kanter et al. | 726/28 |
| 2015/0222701 A1* | 8/2015 | Zehavi | H04L 61/1594 709/204 |
| 2015/0350351 A1* | 12/2015 | Tung | H04L 67/306 709/204 |
| 2016/0026823 A1* | 1/2016 | Kollenkark | G06F 21/6245 726/27 |
| 2016/0027052 A1* | 1/2016 | Rodriguez | G06Q 30/0257 705/14.55 |

* cited by examiner

*Primary Examiner* — Christopher Revak
(74) *Attorney, Agent, or Firm* — IP Investment Law Group

(57) ABSTRACT

A computing system includes a context module configured to determine a sharing context; an option module, coupled to the context module, configured to generate a sharing option for the sharing context based on a default set for the sharing context, a user's past sharing selection for the sharing context, and a personalization degree for the sharing context; and a privacy preference module, coupled to the option module, configured to estimate a user's privacy preference based on the sharing option.

20 Claims, 8 Drawing Sheets

COMPUTING SYSTEM WITH PRIVACY MECHANISM AND METHOD OF OPERATION THEREOF

CROSS-REFERENCE TO RELATED APPLICATION

This application claims the benefit of U.S. Provisional Patent Application Ser. No. 61/790,466 filed Mar. 15, 2013, and the subject matter thereof is incorporated herein by reference thereto.

TECHNICAL FIELD

An embodiment of the present invention relates generally to a computing system, and more particularly to a system for privacy.

BACKGROUND

Modern consumer and industrial electronics, such as computing systems, televisions, tablets, cellular phones, portable digital assistants, projectors, and combination devices, are providing increasing levels of functionality to support modern life. In addition to the explosion of functionality and proliferation of these devices into the everyday life, there is also an explosion of data and information being created, transported, consumed, and stored.

Personalization is one mechanism to bring the right information to the right user despite the explosion of data. Personalization is most effective when the user shares information about oneself such that a provider can provide meaningful and contextual information to that user. However, sharing one's information often brings up privacy concerns. Research and development for handling privacy for personalization in existing technologies can take a myriad of different directions.

Thus, a need still remains for a computing system with privacy mechanism balancing the user's concern for privacy while providing sharing options based on context. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a context module configured to determine a sharing context; an option module, coupled to the context module, configured to generate a sharing option for the sharing context based on a default set for the sharing context, a user's past sharing selection for the sharing context, and a personalization degree for the sharing context; and a privacy preference module, coupled to the option module, configured to estimate a user's privacy preference based on the sharing option.

An embodiment of the present invention provides a method of operation of a computing system including: determining a sharing context; generating a sharing option for the sharing context based on a default set for the sharing context, a user's past sharing selection for the sharing context, and a personalization degree for the sharing context; and estimating a user's privacy preference based on the sharing option.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
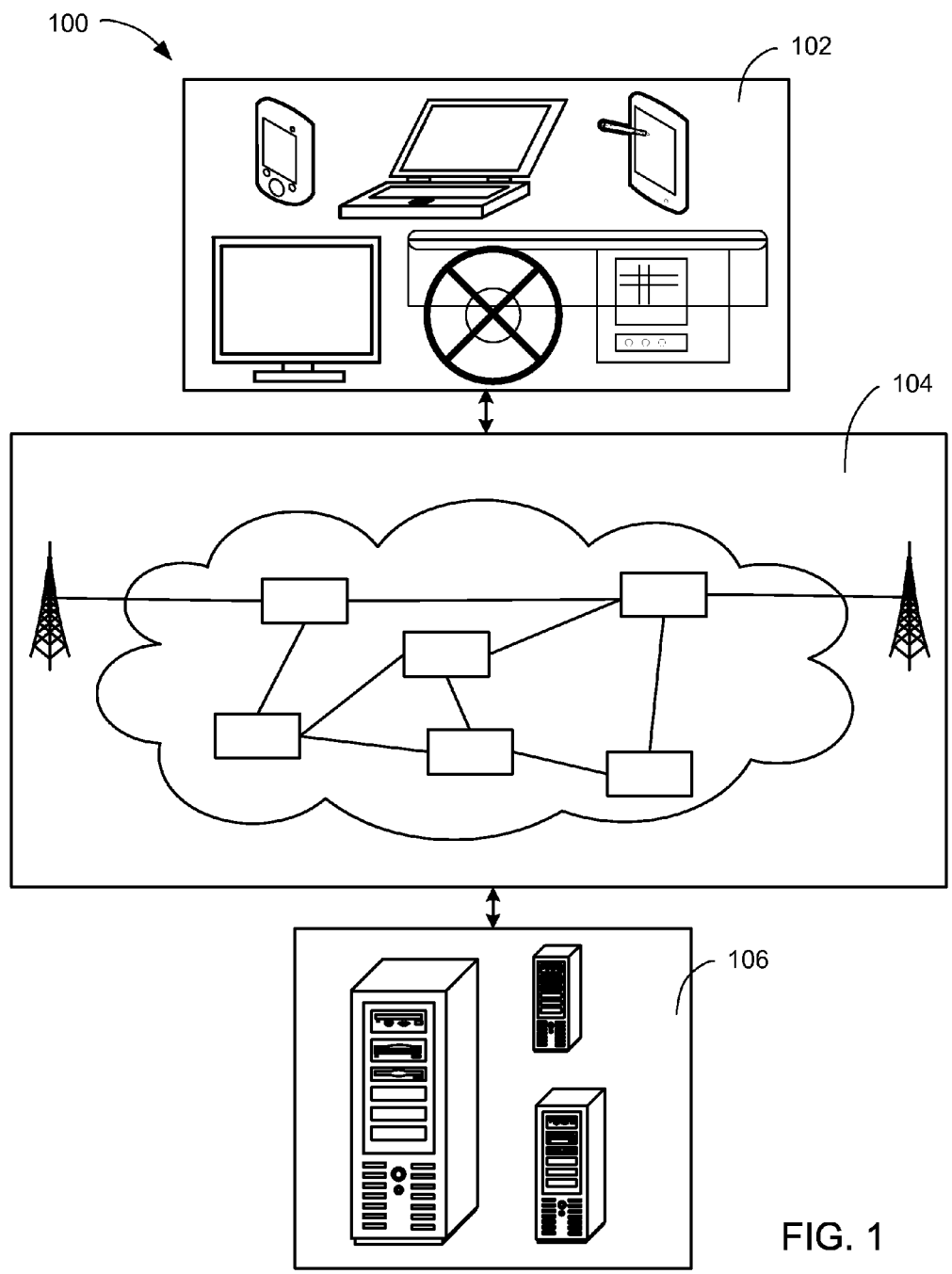
FIG. 1 is a computing system with privacy mechanism in an embodiment of the present invention.

An embodiment of the present invention provides the computing system configured to automate personalization by not requiring the user to manually label the sharing options. The computing system updates the sharing set and the sharing options for the sharing context based on implicit user feedback. The computing system provides the personalization degree for personalizing the sharing options for a particular user for the sharing context. The personalization degree can adjust based on the deviation from the general public or the default set. The personalization degree is modified based on the default match to the default set, the personalization match to the sharing set, the adjustment rate, or a combination thereof.

An embodiment of the present invention provides the computing system configured to provide personalize sharing option for any sharing scenario as the sharing context, the computing system provides one or multiple default sharing options. The sharing scenarios (context) and their corresponding (mapping) sharing options can be different in different systems. Different individuals have different preferences when choosing a sharing option that fits him/her in each scenario. These individual preferences can be affected by personality traits. For example, for a particular user, when the location is home, he is very careful; much more conservative than most people. When the sharing is in other scenarios, he is willing to share maximally, more open than many people. The computing system dynamically and incrementally learns an individual user's such sharing preference.

An embodiment of the present invention provides the computing system configured to eliminate over personalizing the sharing options in the sharing set and avoid too restrictive set of options for the sharing context. The computing system compares a number of sharing choices over the time period and compares those choices to the default set, the sharing set, or both. The user's own sharing choices correctly represent the user's privacy preference, and the personalization scheme is able to rank the best choices high in the result lists for most of time. In those sharing scenarios, it can be desirable to increase the personalization degree so as to bring more personalized choices high in the list for future sharing. On the contrary, for some sharing scenarios, personalization is not necessarily effective. For example, when the number of sharing selections for a particular sharing context is small, the user's own sharing choices do not represent him well. A too high personalization degree will affect the ranked list more than it should, and then it is desirable to decrease the personalization degree.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with privacy mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

Users of the first device 102, the second device 106, or a combination thereof can communicate with each other or access or create information including text, images, symbols, location information, and audio, as examples. The users can be individuals or enterprise companies. The information can be created directly from a user or operations performed on these information to create more or different information.

In the connected world, information creation, transmission, and storage are pervasive as well as the desire to consume all these information by the users. However, the shear mass of information makes it impossible to effectively and efficiency consume or share the right information and the right time.

Personalization can allow for the right information, content, services, or products to share to the right person in the right time for the correct context. In order for personalization to be effective or the most effective, the providers of these information, content, services, or products need information about the user to receive the information from the provider. Personalization can require the user to share personal information while maintaining a level of comfort for the amount of privacy the user wants to maintain.

Sharing settings to address these privacy concerns can be in the first device 102, in the second device 106, within the communication path 104, or a combination thereof. The sharing settings can be addressed and distributed between the first device 102, the second device 106, and the communication path 104.

Returning to the description of the computing system 100, the first device 102 can be of any of a variety of devices, such as a smartphone, a cellular phone, personal digital assistant, a tablet computer, a notebook computer, or other multi-functional display or entertainment device. The first device 102 can couple, either directly or indirectly, to the communication path 104 to communicate with the second device 106 or can be a stand-alone device.

For illustrative purposes, the computing system 100 is described with the first device 102 as a display device, although it is understood that the first device 102 can be different types of devices. For example, the first device 102 can also be a device for presenting images or a multimedia presentation. A multi-media presentation can be a presentation including sound, a sequence of streaming images or a video feed, text or a combination thereof.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of network types and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
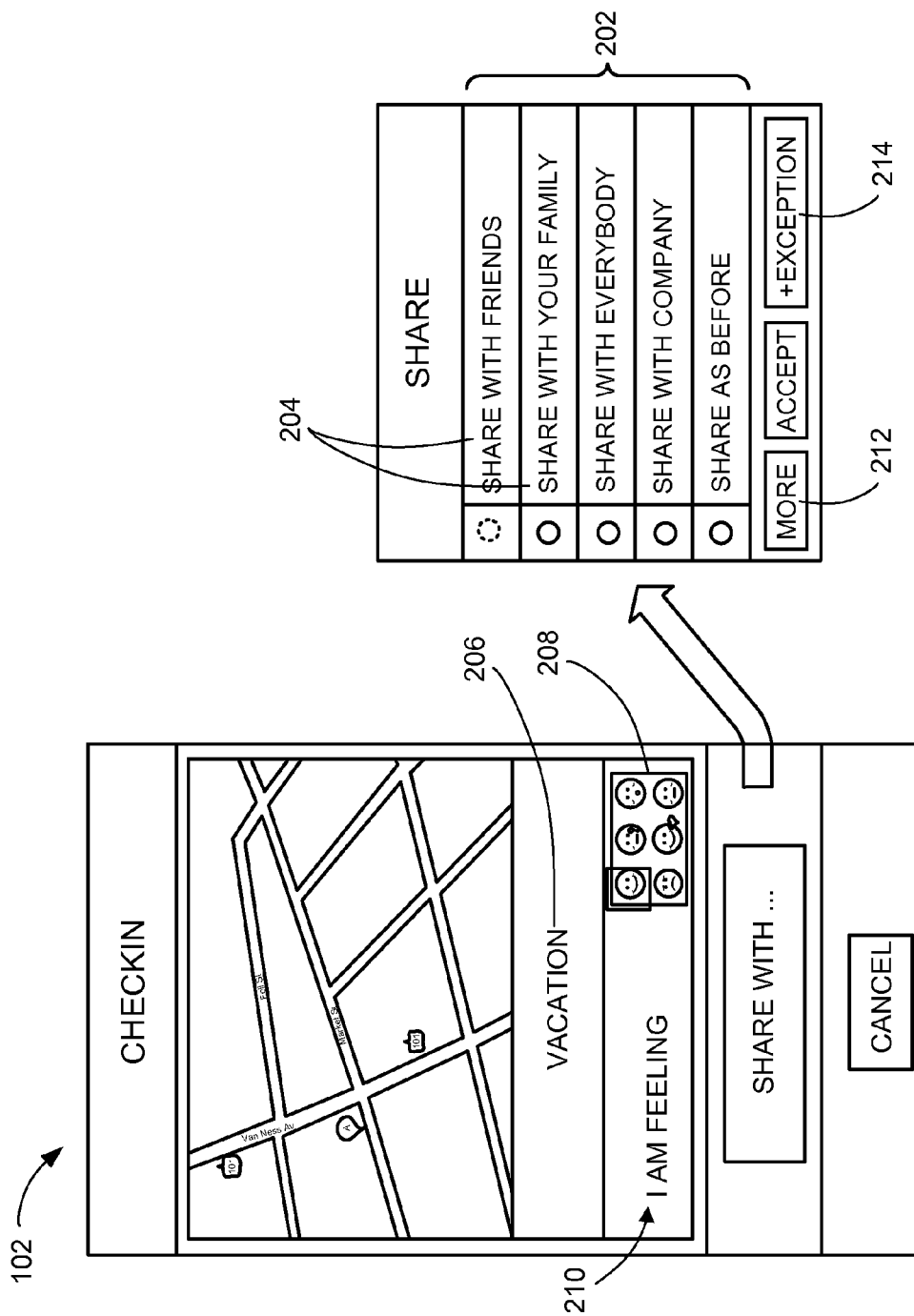
FIG. 2 is an example display of the first device with a sharing set based on a sharing context.

Referring now to FIG. 2, therein is shown an example display of the first device 102 with a sharing set 202 of sharing options 204 based on a sharing context 206. The sharing set 202 is a group of the sharing options 204 based on the sharing context 206. The sharing context 206 provides information regarding content 208 to be shared. For example, the sharing context 206 can identify the sharing scenario in which to share information. The sharing context 206 can be used to help determine which of the sharing options 204 are feasible in the sharing set 202. The content 208 is the information a user (not shown) of the computing system 100 can share with others.

FIG. 2 provides an example for the sharing set 202 with the sharing options 204 for the sharing context 206 and the content 208 for a sharing category 210. FIG. 2 depicts an example of the sharing context 206 where the user is on vacation, for example at Hawaii. The sharing context 206 can be used to determine a sharing category 210 for the sharing set 202.

The sharing category 210 is the type or classification of information for the user to potentially share with others. The sharing category 210 can determine the details or the available selections of the sharing options 204 for the sharing context 206.

In this example, the sharing category 210 can be an emotional state or feeling the user has about being on vacation. The content 208 can be represented by text, images, symbols, audio, video, or a combination thereof. Here, the content 208 for this sharing category 210 is represented by emoticons, such as for happy, sad, laughing, surprised, or angry.

Further for this example, the sharing options 204 are based on the sharing context 206 of a vacation and the sharing category 210. The sharing options 204 can range from sharing with those in the user's personal circle, such as with friends or family, to a more open sharing policy or privacy preference by sharing with everybody or at a company, such as the user's place of employment.

FIG. 2 also depicts other options other than the sharing options 204. The computing system 100 can also provide an opportunity for the user to request additional options 212. The additional options 212 are potential sharing options that presented to the user and different to the sharing options 204 as part of the sharing set 202. The additional options 212 enables a selection of a different selection for sharing the content 208 differently that what is initial presented with the sharing options 204 of the sharing set 202. The additional options 212 can also be based on the sharing context 206 and the sharing category 210.

The computing system 100 can also provide exceptions 214. The exceptions 214 represent additional modifications to the sharing options 204 presented in the sharing set 202. For example, the user on vacation can choose to share the emoticon for his or her vacation with those at her company but can choose to modify the list of individuals in the group of people associated with the "Company". The user can add or remove individuals to receive the content 208. The choices available with the exceptions 214 can also be based on the sharing context 206 and the sharing category 210.

For example, in one information sharing system, the sharing context 206 can be a sharing scenario and can help determine the sharing options 204 in the sharing set 202 that are potentially feasible between how the user evaluates sharing information and the sharing options 204. For example, when the user feels embarrassed about the information being shared, the sharing options 204, which can be feasible, can be "sharing with family members; sharing with family member and a circle of close social friends; keep private from all social contacts; turn off the sharing system completely". When the user feels excited about the information under sharing, the sharing options 204, which can be feasible, can be "sharing with all social contacts; sharing with family members and close friends; sharing with family members; sharing with the service providers".

In another information sharing system example, the sharing context 206 as a sharing scenario and the sharing options 204, which can be feasible for the sharing context 206, can be between contextual factors (such as time/location of the time). For example, when the user is at work/office during the day, the sharing context 206 at the work location can help determine the sharing options 204, which can be feasible, can be "sharing with family members; sharing with family member and close friends; sharing with managers/colleagues". When the user is at a bar in the evening, the sharing options 204 that can be feasible can be "sharing with family members; sharing with a particular circle of friends; sharing with friends who happen to be near by".

Figure 3:
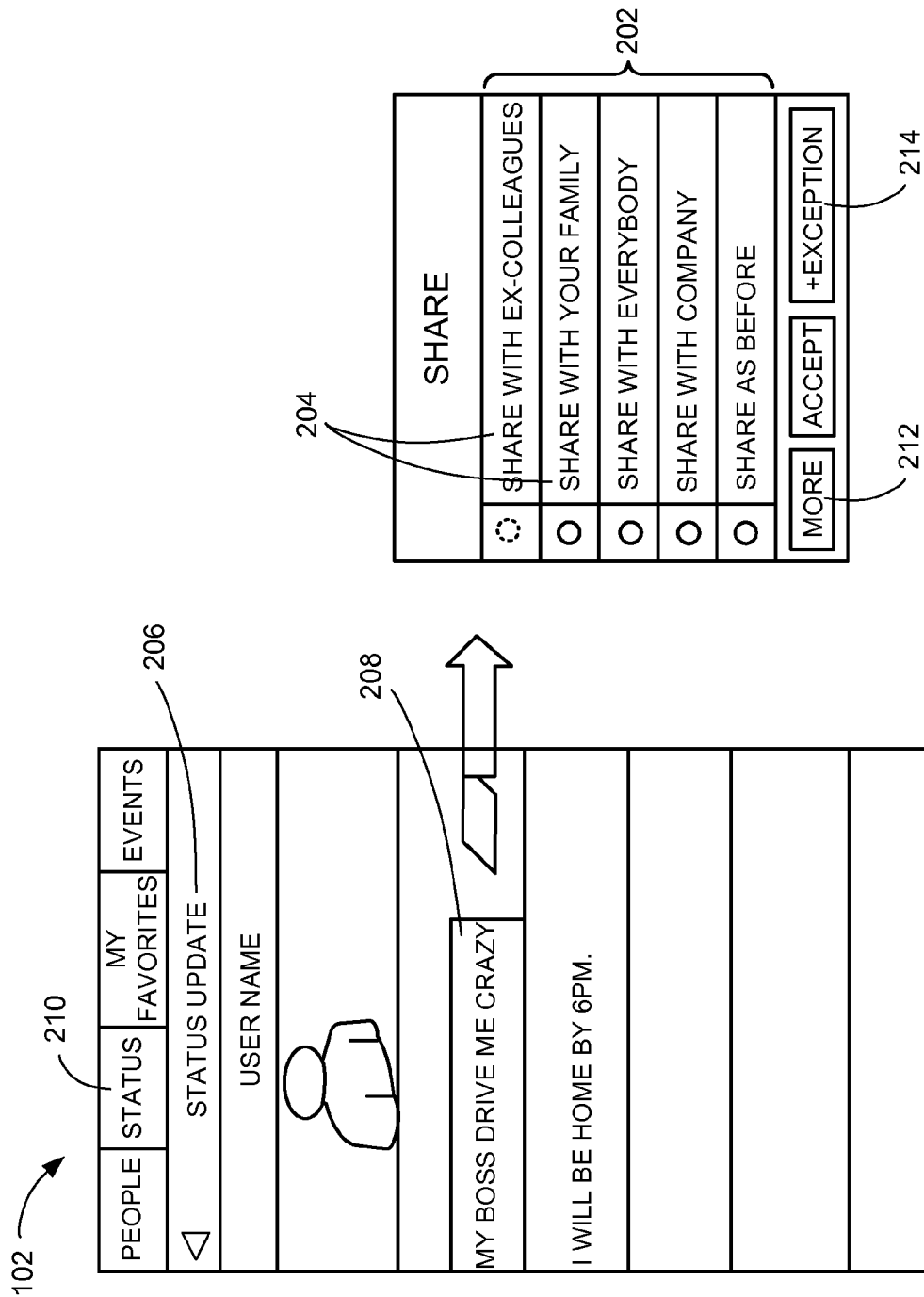
FIG. 3 is a further example display of the first device with the sharing set of the sharing options based on the sharing context.

Referring now to FIG. 3, therein is shown a further example display of the first device 102 with the sharing set 202 of the sharing options 204 based on the sharing context 206. FIG. 3 depicts an example of the sharing context 206 as providing updates about the user or as a more specific example about the user's professional life. The content 208 in this example can include updates regarding any aspects about the user's life or the user's choice on topics.

FIG. 3 provides examples for the content 208 surrounding his or her professional life and personal life. The content 208 can include the user's actual opinion about her boss or an update about her progress on a work project. Similar to the description in FIG. 2, the sharing options 204 can be based on the sharing context 206. The details or the type of selections for each of the sharing options 204 as well as the mix of the sharing options 204 in the sharing set 202 can be based on the sharing context 206. In this example, the sharing context 206 is about professional life.

Because the sharing category 210 can range quite a bit for this type of the sharing context 206, the content 208 can be part of the sharing context 206 and can also be used determine the sharing options 204 available in the sharing set 202 present to the user. For example, the content 208 of the user's frustration with her boss can be used to provide the sharing options 204 to exclude any groups that would be inclusive of that boss or anyone close to that boss. Similarly, the content 208 providing updates about her progress on a project for work can be used to include provide the sharing options 204 for those within the company or those with the appropriate confidentially relationship to receive such updates and not sent to the general public or even to perhaps friends and family.

As in FIG. 2, the example in FIG. 3 can also provide the additional options 212 if the sharing options 204 initially provided in the sharing set 202 are not adequate or appropriate. This example also provide the exceptions 214 allowing modifications to members in the group to share for one or more of the sharing options 204 in the sharing set 202.

Figure 4:
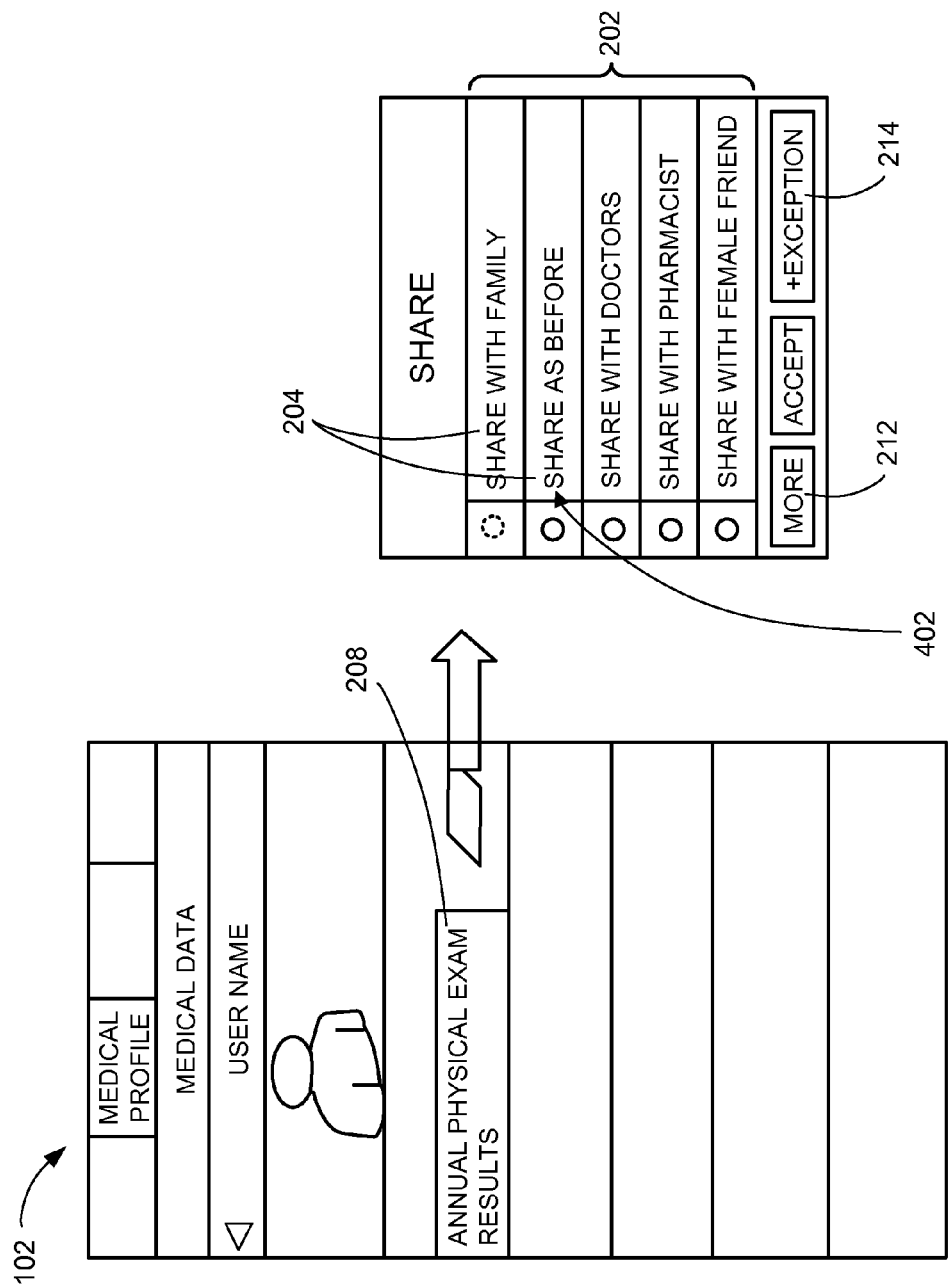
FIG. 4 is a yet further example display of the first device with the sharing set based on the sharing context.

Referring now to FIG. 4, therein is shown yet further example display of the first device 102 with the sharing set 202 based on the sharing context 206. Similar to FIG. 3, FIG.

4 depicts an example of the sharing context 206 for providing updates about the user but with a more narrow focus. The content 208 in this example can include updates regarding medical information about the user.

FIG. 4 provides examples for the content 208 surrounding her medical care or status. The content 208 can include various information about the user's medical care, history, or condition. The content 208 can also include updates about the user's recent medical exam, known allegories, and medication list.

Similar to the description in FIG. 2 and FIG. 3, the sharing options 204 can be based on the sharing context 206. The details or the type of selections for each of the sharing options 204 as well as the mix of the sharing options 204 in the sharing set 202 can be based on the sharing context 206. The content 208 can be part of the sharing context 206 and can also be used determine the sharing options 204 available in the sharing set 202 present to the user.

For example, the content 208 of the user's recent medical exam can be used to determine the sharing options 204 for the sharing set 202 to include others in the user's personal or professional circle. As would be typical, the sharing options 204 can include sharing with those in the user's personal circle, such as friends and family. The sharing options 204 can also include sharing with those related to the sharing context 206 of the user's medical care and can include sharing with the user's other doctors or pharmacists. The sharing options 204 can include a user's past sharing selection 402, which represents the election of groups or members based on the last or past sharing for this type of sharing context 206 or the content 208. The sharing options 204 can also limit the sharing to those that of a particular gender based on the type of medical conditions or status more related for that gender.

As in FIG. 2 and FIG. 3, the example in FIG. 4 can also provide the additional options 212 if the sharing options 204 initially provided in the sharing set 202 are not adequate or appropriate. This example also provide the exceptions 214 allowing modifications to members in the group to share for one or more of the sharing options 204 in the sharing set 202. The additional options 212, the exceptions 214, or a combination thereof can be used to determine the details for the user's past sharing selection 402.

Figure 5:
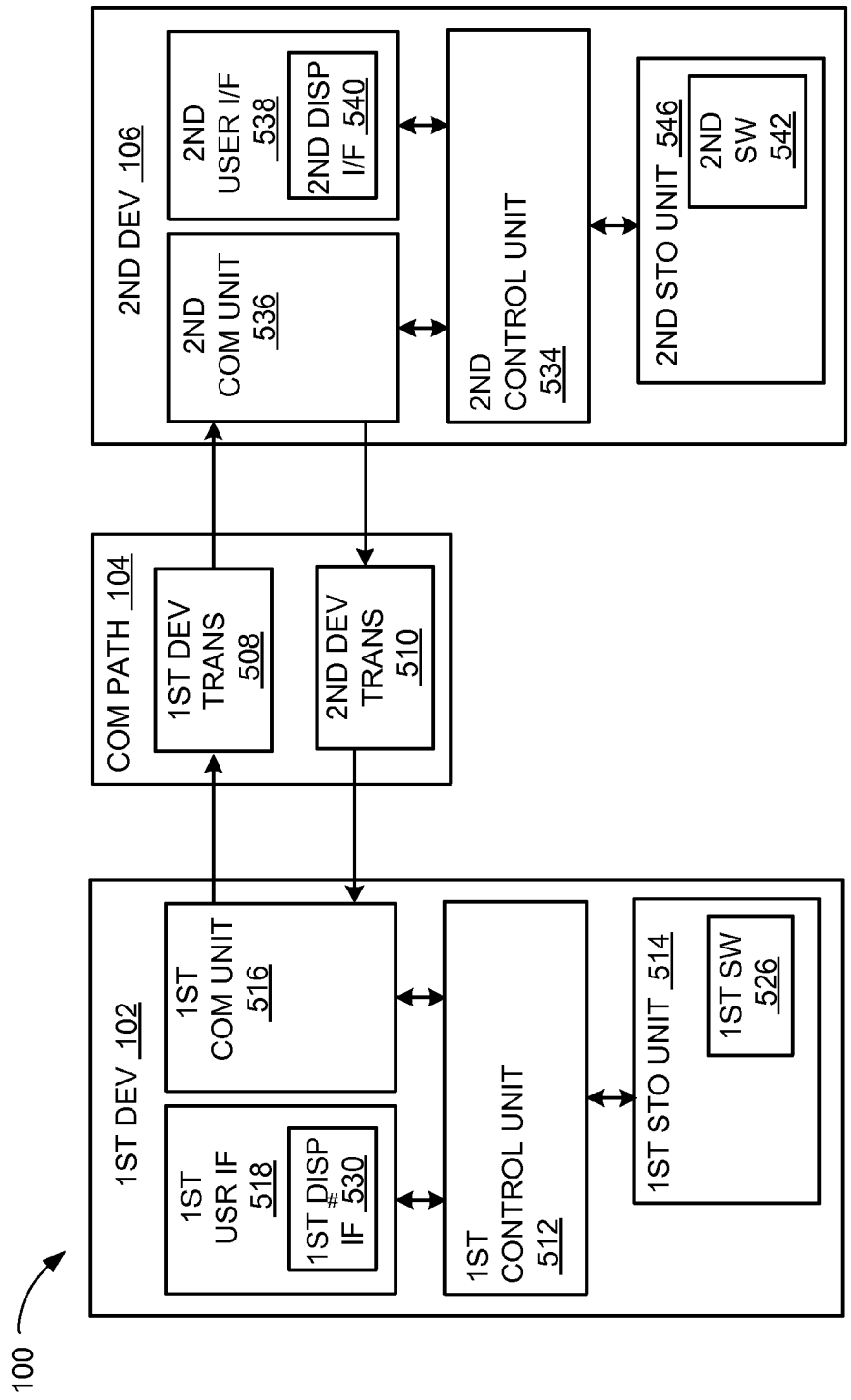
FIG. 5 is a functional block diagram of the computing system.

Referring now to FIG. 5, therein is shown an exemplary block diagram of the computing system 100. The computing system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

The first device 102 can include a first control unit 512, a first storage unit 514, a first communication unit 516, and a first user interface 518. The first control unit 512 can execute a first software 526 to provide the intelligence of the computing system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control unit 512 can communicate with other functional units in and external to the first device 102. The external sources and the external destinations refer to sources and destinations external to the first device 102.

The first storage unit 514 can store the first software 526. The first storage unit 514 can also store the relevant information, such as the application code 604 of FIG. 6, the instrumentation code 606 of FIG. 6, the report 602 of FIG. 6, or a combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM). The first storage unit 514 can communicate between and other functional units in or external to the first device 102.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104. The first communication unit 516 can communicate with other functional units in and external to the first device 102.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the computing system 100. The first control unit 512 can also execute the first software 526 for the other functions of the computing system 100. The first control unit 512 can further execute the first software 526 for interaction with the communication path 104 via the first communication unit 516.

The second device 106 can be optimized for implementing an embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the computing system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the computing system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof. The second control unit 534 can communicate with other functional units in and external to the second device 106.

A second storage unit 546 can store the second software 542. The second storage unit 546 can also store the information, such as data representing the information discussed in FIG. 6. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the computing system 100 is shown with the second storage unit 546 as a single hierarchy storage system, although it is understood that the computing system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM). The second storage unit 546 can communicate with other functional units in or external to the second device 106.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104. The second communication unit 536 can communicate with other functional units in and external to the second device 106.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The computing system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 6:
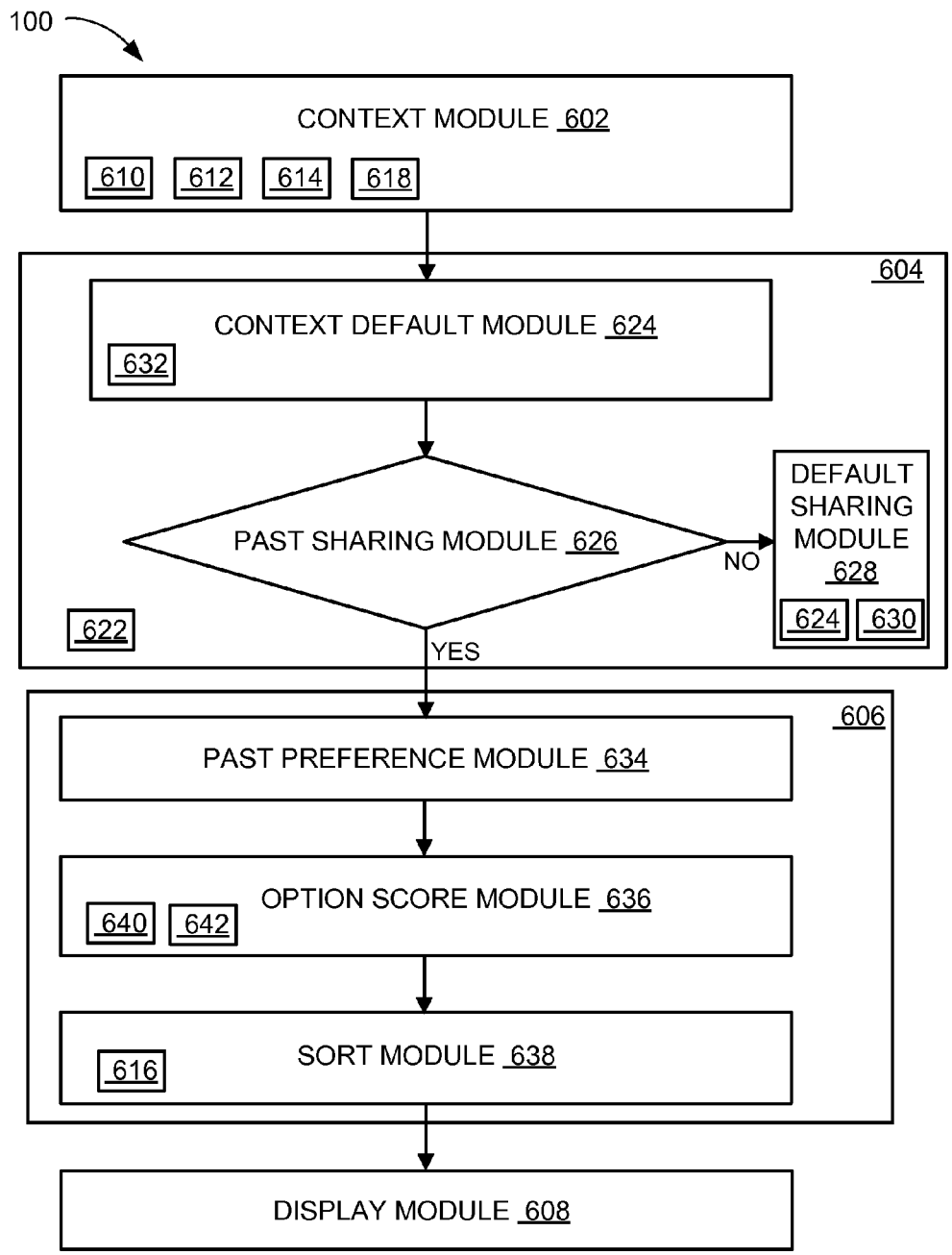
FIG. 6 is a control flow of the computing system.

Referring now to FIG. 6, therein is shown a control flow of the computing system 100. The computing system 100 can include a context module 602, an option module 604, a privacy preference module 606, and a display module 608.

The modules described in this application are coupled to other modules as described or as shown in the figures. The modules can be coupled with each other through direct communication with each other without intervening modules. The modules can also be coupled with each other through indirect communication with intervening active circuitry, modules, or combination thereof. The modules can progress from one to the other as described or as shown. The control flow can progress from one module in a linear fashion or can include loop-backs, iterations, feedback, or a combination thereof.

The context module 602 is configured to determine the sharing context 206 of FIG. 2. The context module 602 is also configured to detect a context change 610 for the sharing context 206.

The context module 602 can determine the sharing context 206 in a number of ways. For example, the context module 602 can determine the sharing context 206 based on the user's input or past history for the sharing category 210 of FIG. 2, the content 208 of FIG. 2, or a combination thereof. The context module 602 can also determine the sharing context 206 based on a current environment 612 for the user of the first device 102 of FIG. 1. The current environment 612 relates the environmental condition for the user while sharing the information.

For example, the current environment 612 can include the type of location, such as a professional setting or a personal setting. The current environment 612 can also relate to the time of day or the week, such as working hours or a working day. The current environment 612 can also include the type of activities for the user's sharing, such as while on vacation, at a party, at a bar, or at a professional conference.

The context module 602 can use the content 208 to determine the sharing context 206. The type of information for the content 208 can help determine a sharing of a professional nature or a personal nature, as in the examples described in FIG. 2, FIG. 3, and FIG. 4. For example, if the current environment 612 is at a party or at a bar, the context module 602 can determine the sharing options 204 to include those near a user's location 614, which is the user's physical location.

The factors, as described earlier as examples, for determining the sharing context 206 can be used to determine type of sensitivity or a user's privacy preference 616 for sharing that content 208. The user's privacy preference 616 can be used to estimate or determine the types of people or members of a group, groups, or a combination thereof to determine the sharing options 204 for the sharing set 202 of FIG. 2. The user's privacy preference 616 can also be used to determine a sharing target's proximity 618, which is the physical closeness to the user's location 614 or for the event the user is attending while sharing the content 208.

Returning to the context module 602 to detect the context change 610, the context module 602 can perform this function in a number of ways. The context change 610 is a change, shift, or modification in the sharing context 206.

The context change 610 can be detected in a number of ways. For example, a change in the current environment 612 can cause the context change 610. A change in physical location or the type of location can be used to detect the context change 610. As an example, the context change 610 can be detected when the user leaves work and goes to a friend's house for a party or goes to a bar for drinks with friends. The context change 610 can also be detected on the sharing category 210 as the different context between and described in FIG. 2, FIG. 3, and FIG. 4, as examples. The context change 610 can be detected when the content 208 entered by the user can possibly change the member in a group, types of groups, type of circle (professional or personal), or a combination thereof. The context change 610 can further be detected by the user's selection of the additional options 212 of FIG. 2, the exceptions 214 of FIG. 2, or a combination thereof. The flow can progress from the context module 602 to the option module 604.

Returning to the option module 604, this module is configured to generate the sharing set 202 and the sharing options 204 to be initially presented. The option module 604 is also configured to change a default set 620 for the context change 610. Examples of the sharing options 204 for the sharing context 206 are shown and described in FIG. 2, FIG. 3, and in FIG. 4.

The option module 604 can generate the sharing set 202 with the sharing options 204 in a number of ways. For example, the option module 604 can generate the sharing set 202 with the sharing options 204 for the sharing context 206 based on the default set 620 for the sharing context 206, the user's past sharing selection 402 of FIG. 4 for the sharing context 206, and a personalization degree 622 for the sharing context 206. The option module 604 can include a context default module 624, a past sharing module 626, and a default sharing module 628.

The context default module 624 is configured to select default options 630 for the sharing context 206, rank the default options 630 in the default set 620, provide the default set 620 having a top ranked sharing options 204 from the default options 630, or a combination thereof.

The context default module 624 can retrieve and select other people' sharing decisions as the default options 630 for the default set 620 in order to handle cold-start situations. The default set 620, the default options 630, or a combination thereof can be retrieved from the second device 106 of FIG. 1 or the cloud.

The default set 620 of the default options 630 can be derived from existing users for the computing system 100. For example, for each sharing scenario for the sharing context 206, the default set 620 include the default options 630 that are the top-k popularly chosen options among current existing users, ranking the most popular one on top. The default set 620, the default options 630, or a combination thereof can be selected based a default score 632 for the default set 620 or for each of the default options 630. The default score 632 can be a normalized value, for example, it can be specified to be the proportion of existing reporting users in the system choosing this option "x" for this sharing scenario as the sharing context 206. The more people choose it, the higher value for the default score 632. The context default module 624 can rank the default options 630 for the default set 620 based on the default score 632. The default score 632 can also represent the relevance for default options 630, the default set 620, or a combination thereof relative to the sharing context 206.

The flow can progress from the context default module 624 to the past sharing module 626. The past sharing module 626 can determine whether the user has a past sharing history or the user's past sharing selection 402 for this sharing context 206, the sharing category 210, the content 208, or a combination thereof. If there exist the user's past sharing selection 402 for the sharing context 206, then the flow can progress from the context default module 624 to the privacy preference module 606 to continue to generate the sharing set 202 including the sharing options 204 for the sharing context 206. If there is not the user's past sharing selection 402, then the context default module 624 can provide the default set 620 with the default options 630, which has been ranked as described earlier, as the sharing set 202 for the sharing options 204 to handle the cold-start scenario or first time usage to share the content 208 for the sharing context 206.

The privacy preference module 606 is configured to estimate the user's privacy preference 616 based on the sharing options 204 for the sharing context 206. The privacy preference module 606 can utilize the user's past sharing selection 402, the default set 620 with the default options 630, or a combination thereof to generate the sharing set 202 and the sharing options 204 for the sharing context 206. The privacy preference module 606 can include a past preference module 634, an option score module 636, and a sort module 638.

The past preference module 634 is configured to determine the accuracy of the sharing set 202 with the sharing options 204. The accuracy can be used to determine how good the estimation of the user's privacy preference 616 with the sharing set 202. The past preference module 634 is also configured to determine the accuracy of the amount of personalization in the sharing set 202.

The past preference module 634 can calculate a personalization degree 622 for the sharing set 202. The past preference module 634 can calculate a priority score 640 based on the default score 632 for the default options 630 as the sharing options 204 in a cold-start scenario. The past preference module 634 can also calculate the priority score 640 based on a user's matching score 642 for the sharing options 204. The user's matching score 642 can be specified to be the proportion of the choice for this option "x" only from the current user for this sharing scenario for the sharing context 206. The priority score 640 for each of the sharing options 204 allows for the ranking for each of the sharing options 204 to determine which will be part of the sharing set 202.

The past preference module 634 will be discussed more in FIG. 7. The flow can progress from the past preference module 634 to the option score module 636.

The option score module 636 is configured to configured to calculate the priority score 640 for each of the sharing options 204. The option score module 636 is also configured to calculate the priority score 640 for the sharing context 206 based on the default score 632 for the sharing option, the user's matching score 642 for each of the sharing options 204, and the personalization degree 622. As an example, the priority score 640 can be computed with the function expressed in Equation 1.

$$\text{Priority score}(x) = \text{default score}(x) * (1-p) + \text{user's matching score}(x) * p \quad \text{(Equation 1)}$$

The variable "p" is the "personalization degree" for this user for this sharing scenario as the sharing context 206.

The personalization degree 622 can be initialized to a value in [0:1] (eg., 0.5) and can be adjusted over time, depending on whether the current personalization setting effectively fits the user for this sharing scenario as the sharing context 206. Not only different users can end up having different values for the personalization degree 622 but also the same user can have different values for the personalization degree 622 for different sharing scenarios. A higher value for the personalization degree 622 can result in a larger influence of the user's own existing sharing choices or the user's past sharing selection 402. The flow can progress from the option score module 636 to the sort module 638.

The sort module 638 is configured to estimate the user's privacy preference 616 based on the sharing options 204 in the sharing set 202. The sort module 638 is also configured to generate the sharing set 202 and provide the sharing set 202 with the sharing options 204 ranked with the priority score 640 for each of the sharing options 204. The sharing options 204 in the sharing set 202 can be the top ranked of the available options. The flow can progress from the sort module 638 to the display module 608.

The display module 608 can present the sharing set 202 with the sharing options 204 to the user. Examples of the sharing set 202 can be seen in FIG. 2, FIG. 3, and FIG. 4. The sharing set 202 can be the default set 620 with the default options 630 for a cold-start situation. The sharing set 202 can also be based on the user's past sharing selection 402. The sharing set 202 can be a mix of the default options 630 as well as the sharing options 204 based on the user's past sharing selection 402.

The computing system 100 has been described with module functions or order as an example. The computing system 100 can partition the modules differently or order the modules differently. For example, although FIG. 6 depicts the flow continuing from the past preference module 634 to the option score module 636, however, the personalization degree 622 and updates to it can be generated after the display module 608.

The modules described in this application can be hardware implementation, hardware circuitry, or hardware accelerators in the first control unit 512 of FIG. 5 or in the second control unit 534 of FIG. 5. The modules can also be hardware implementation, hardware circuitry, or hardware accelerators within the first device 102 or the second device 106 but outside of the first control unit 512 or the second control unit 534, respectively.

The modules described in this application can be stored in a non-transitory computer readable medium. The first storage unit 514 of FIG. 5, the second storage unit 546 of FIG. 5, or a combination thereof can represent the non-transitory computer readable medium. The first storage unit 514, the second storage unit 546, or a combination thereof or a portion thereof can be removable from the first device 102 of FIG. 5 or the second device 106 of FIG. 5. Examples of the non-transitory computer readable medium can be a non-volatile memory card or stick, an external hard disk drive, a tape cassette, or an optical disk.

Figure 7:
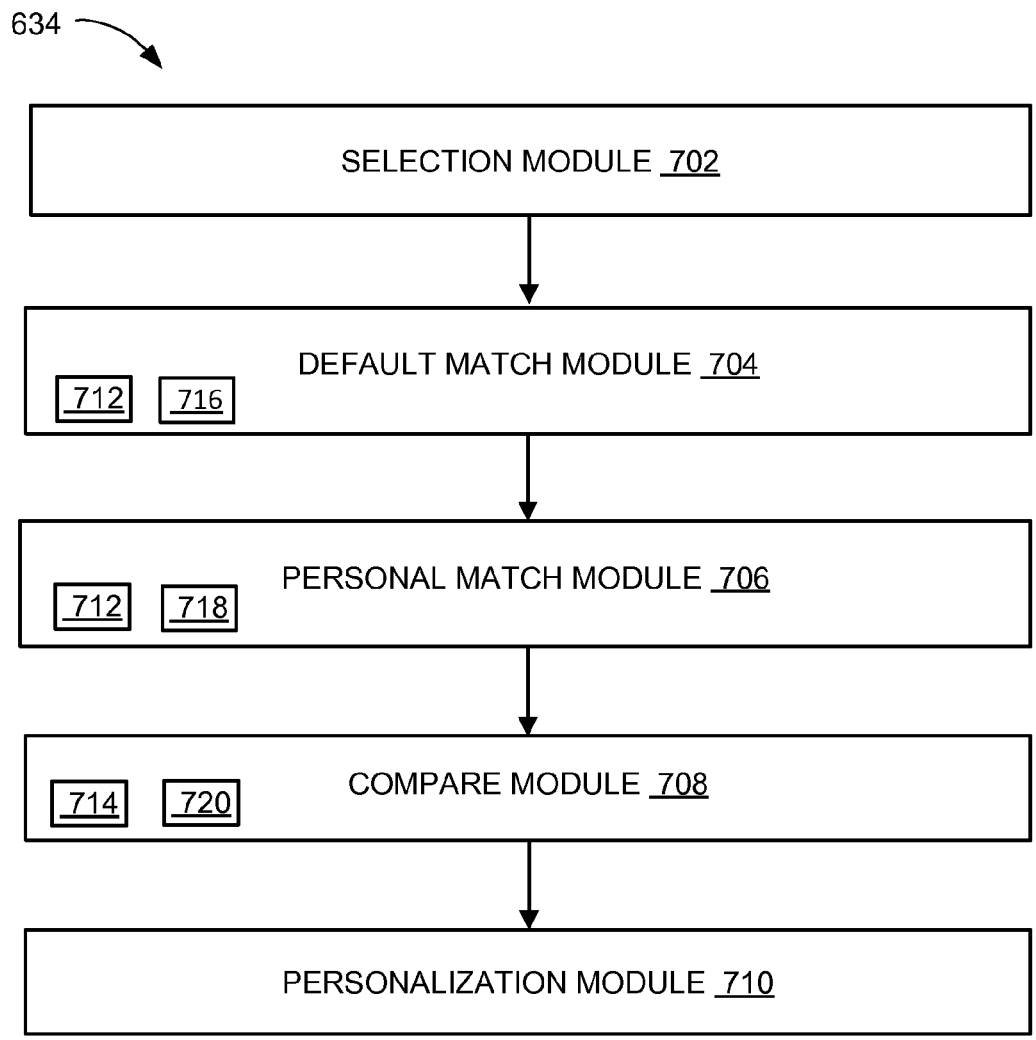
FIG. 7 is a control flow of the past preference module.

Referring now to FIG. 7, therein is shown a control flow of the past preference module 634. The past preference module 634 is configured to determine the accuracy of the sharing set 202 with the sharing options 204. The accuracy can be used to determine how good the estimation of the user's privacy preference 616 with the sharing set 202. The past preference module 634 is also configured to determine the accuracy of the amount of personalization in the sharing set 202. The past preference module 634 can include a selection module 702, a default match module 704, a personal match module 706, a compare module 708, and a personalization module 710.

The selection module 702 is configured to receive the user's past sharing selection 402 of FIG. 4 from the sharing set 202 with the sharing options 204 for the sharing context 206. The selection module 702 is also configured to receive the user's past sharing selection 402 over a time period 712. The selection module 702 can retrieve the user's past sharing selection 402 from the second device 106 or from the cloud. The time period 712 can be based on the first usage with the default set 620 and the default options 630 for the sharing context 206. The user's past sharing selection 402 can also include the selections from the sharing set 202, the additional options 212 of FIG. 2, the exceptions 214, or a combination thereof. The flow can progress from the selection module 702 to the default match module 704.

The default match module 704 is configured to determine a deviation 714 of the user's past sharing selection 402 from the default set 620. The default match module 704 is also configured to calculate a default match 716 for the user's past sharing selection 402 with the default set 620. As a more specific example, the default match 716 is a metric to help measure who good the default options 630 in the default set 620 are relative to the user's past sharing selection 402 from the default options 630. The deviation 714 is a metric for how the user's choices did not match the sharing set 202 and the order of the sharing options 204. The deviation 714 can be based on the default match 716, a personalization match 718, or a combination thereof.

The past preference module 634 can help evaluate the effectiveness of the personalization with the current value for the personalization degree 622. The default match 716 can be used to adjust the personalization degree 622.

Let S be the set of sharing choices from the sharing set 202 and the sharing options 204 chosen over the time period 712 by the user "u" for a particular sharing scenario for the sharing context 206 compared to the original set or the default set 620 of ranked lists for the default options 630. For example, S={1, 2, 1, 4, 3, 2, 1, −1} meaning option 1 in the default recommended ranked list was actually chosen by the user in one instance of this sharing scenario; in another instance of the sharing context 206, the highest ranked option 1 was not chosen, instead option 2 in the default set 620 was actually chosen by the user, so on and so forth. Choice −1 indicates none of the default options 630 in the default set 620 was chosen by the user, the user chooses another option. This other options can be the additional options 212, the exceptions 214, or a combination thereof for the sharing context 206.

The default match 716 is a score between the default recommended list presented as the default options 630 in the default set 620 and the actual choices' list from the user can be calculated with Equation 2, as an example.

$$\text{default match}(S) = \text{Sum}((2ri-1)/\log 2(Si+1)) \quad \text{(Equation 2)}$$

ri=1 if one of the recommended option in the default set 620 is chosen by the user and ri is 0 otherwise.

i=[1,n] where n is the number of selections in S.

It is worth noting that S is a set of more than one choice by the user from the default set 620 indicating that the personalization degree 622 can be mitigated until there is sufficient number of choices to attempt a personalization for the sharing context 206. The flow can progress from the default match module 704 to the personal match module 706.

The personal match module 706 is configured to calculate a personalization match 718 for the user's past sharing selection 402 from the sharing set 202, the order of the sharing options 204, or a combination thereof. The personal match module 706 is also configured to detect a user's past sharing selection different from the sharing set 202. Example of what is different is the selection of the additional options 212, the exceptions 214, or a combination thereof. Similarly with the default match 716, the personalization match 718 can be used to adjust the personalization degree 622.

Let L be the set of sharing choices over the time period 712, which is same as for S, by user u for the same sequence of sharing compared to the personalized ranked list of the sharing options 204 in the sharing set 202 based on the priority score 640 calculated with Equation 1. For example, L={1, 2, 1, 2, 1, 1}. We can calculate the personalization match 718 in a similar manner to the default match 716 and calculated with Equation 3, as an example.

$$\text{personalization match}(L) = \text{Sum}((2ri-1)/\log 2(Li+1)) \quad \text{(Equation 3)}$$

ri=1 if one of the recommended option in the sharing set 202 is chosen by the user and ri is 0 otherwise.

i=[1,n] where n is the number of selections in L.

When the higher ranked option is chosen, (in other words, the smaller positive number it is in S or L for a sharing instance), the more it contributes to the value for the default match 716 or the personalization match 718, meaning the higher accuracy the recommendation for the sharing set 202 is for the sharing context 206. The flow can progress from the personal match module 706 to the compare module 708.

The compare module 708 is configured to generate an adjustment rate 720 for the personalization degree 622 based on the default match 716 and the personalization match 718. The compare module 708 compares the values of the default match 716 and the personalization match 718. If the personalization match 718 is higher than the default match 716, then the personalization degree 622 can be increased. The personalization degree 622 can be increased by increasing the adjustment rate 720 for the personalization degree 622 from the default set 620 and the default options 630.

The deviation 714 can be a reciprocal value to the default match 716, the personalization match 718, or a combination thereof. When the default set 620 is selected as the sharing set 202, the deviation 714 can be a reciprocal value to the default match 716. When the sharing set 202 is based on the user's past sharing selection 402 and not solely based on the default set 620, the deviation 714 can be the reciprocal value to the personalization match 718. The flow can progress from the compare module 708 to the personalization module 710.

The personalization module 710 is configured to configured to adjust the personalization degree 622 based on the deviation 714, the adjustment rate 720, or a combination thereof for the sharing context 206. For example, let p0 be the current value of the personalization degree 622 of user "u" for a particular sharing scenario for the sharing context 206. A new value for the personalization degree 622 can be calculated to a new value p1 with Equation 4 or Equation 5, as examples.

$$p1 = p0 - p0 * \text{alpha} * \text{beta} \quad \text{(Equation 4)}$$

Equation 4 is used when the personal match(L)<default match(S)

$$p1 = p0 + (1-p0) * \text{alpha} * \text{beta} \quad \text{(Equation 5)}$$

Equation 5 is used when the personal match(L)>default match(S)

For both Equation 4 and Equation 5, alpha is a real-number parameter controlling adjustment speed.

Also for both Equation 4 and Equation 5, beta can be the adjustment rate 720 and can be computed with Equation 6, as an example.

$$\text{beta} = |\text{personal match}(L) - \text{default match}(S)| / (\text{personal match}(L) + \text{default match}(S)) \quad \text{(Equation 6)}$$

The larger the difference between personal match (L) and default match (S), the faster the personalization degree 622 is adjusted due to larger beta.

The modules described in this application can be part of the first software 526 of FIG. 5, the second software 542 of FIG. 5, or a combination thereof. These modules can also be stored in the first storage unit 514 of FIG. 5, the second storage unit 546 of FIG. 5, or a combination thereof. The first control unit 512, the second control unit 534, or a combination thereof can execute these modules for operating the computing system 100.

Figure 8:
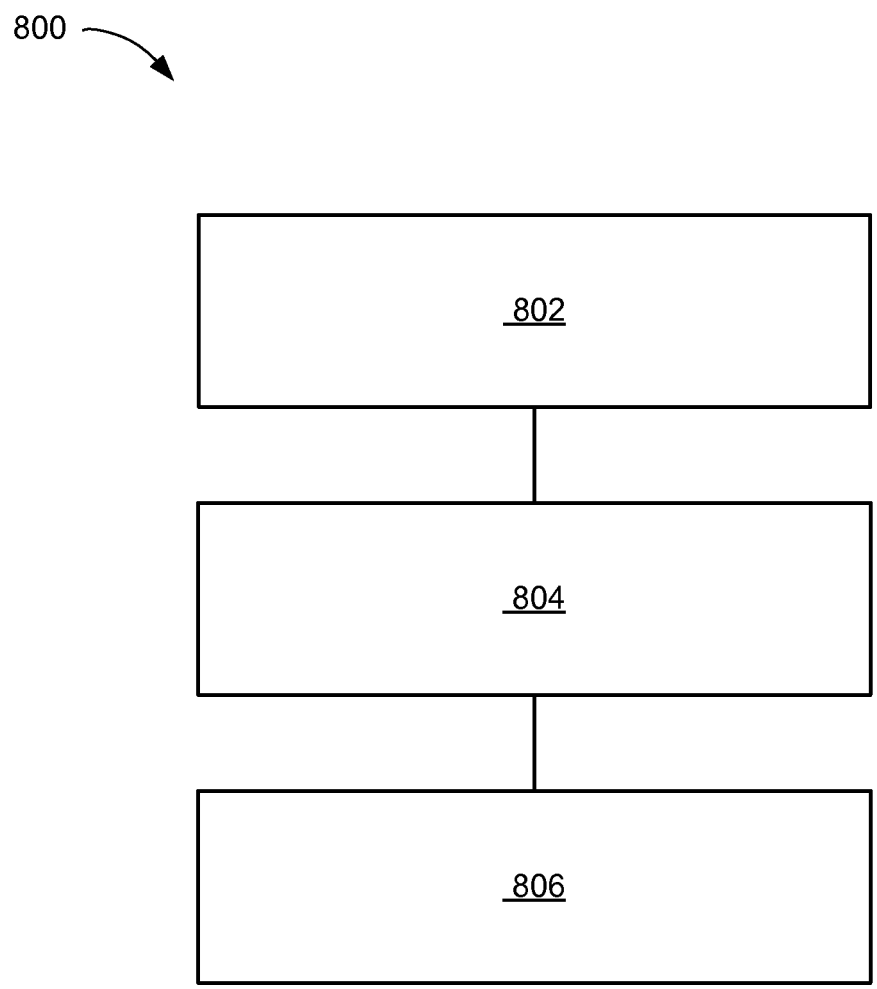
FIG. 8 is a flow chart of a method of operation of a computing system in a further embodiment of the present invention.

Referring now to FIG. 8, therein is shown a flow chart of a method 800 of operation of a computing system 100 in a further embodiment of the present invention. The method 800 includes: determining a sharing context in a block 802; generating a sharing option for the sharing context based on a default set for the sharing context, a user's past sharing selection for the sharing context, and a personalization degree for the sharing context in a block 804; and estimating a user's privacy preference based on the sharing option in a block 806.

It has been discovered that the computing system 100 recommend the sharing options 204 of FIG. 2 in a more dynamic case-by-case approach. The computing system 100 is dynamic and situational sharing based on the sharing context 206 of FIG. 2 rather than static policy profile. The computing system 100 also use other people' sharing decisions as the default set 620 of FIG. 2 with default options 630 of FIG. 2 for the sharing set 202 with the sharing options 204 in order to handle cold-start problem. Also, instead of requiring an individual user to modify the default settings to fit his/her own needs, the computing system 100 automatically learns the user's privacy preference 616 under different sharing scenarios for the sharing context 8 and provide the sharing options 204 that fits individual user's needs.

It has also been discovered that the computing system 100 provides automated personalization by not requiring the user to manually label the sharing options 204. The computing system 100 updates the sharing set 202 and the sharing options 204 for the sharing context 206 based on implicit user feedback. The computing system 100 provides the personalization degree 622 of FIG. 6 for personalizing the sharing options 204 for a particular user for the sharing context 206. The personalization degree 622 can adjust based on the deviation 714 of FIG. 6 from the general public or the default set 620. The personalization degree 622 is modified based on the default match 716 of FIG. 7 to the default set 620, the personalization match 718 of FIG. 7 to the sharing set 202, the adjustment rate 720 of FIG. 7, or a combination thereof.

It has been discovered that the computing system 100 provides personalize sharing option for any sharing scenario as the sharing context 206, the computing system 100 provides one or multiple default sharing options. The sharing scenarios (context) and their corresponding (mapping) sharing options can be different in different systems. Different individuals have different preferences when choosing a sharing option that fits him/her in each scenario. These individual preferences can be affected by personality traits. For example, for a particular user, when the location is home, he is very careful; much more conservative than most people. When the sharing is in other scenarios, he is willing to share maximally, more open than many people. The computing system 100 dynamically and incrementally learns an individual user's such sharing preference.

It has been further discovered that the computing system 100 eliminates over personalizing the sharing options 204 in the sharing set 202 and avoid too restrictive set of options for the sharing context 206. The computing system 100 compares a number of sharing choices over the time period 712 and compares those choices to the default set 620, the sharing set 202, or both. The user's own sharing choices correctly represent the user's privacy preference 616, and the personalization scheme is able to rank the best choices high in the result lists for most of time. In those sharing scenarios, it can be desirable to increase the personalization degree 622 so as to bring more personalized choices high in the list for future sharing. On the contrary, for some sharing scenarios, personalization is not necessarily effective. For example, when the number of sharing selections for a particular sharing context is small, the user's own sharing choices do not represent him well. A too high personalization degree will affect the ranked list more than it should, and then it is desirable to decrease the personalization degree.

The physical transformation from the priority score 640 of FIG. 6, the personalization degree 622, the default match 716, the personalization match 718 results in the movement in the physical world, such as determining the user's selection and the user's past sharing selection 402 of FIG. 6. Movement in the physical world results in changes to the sharing context 206, the personalization degree 622, and the user's privacy preference 616 to increase the effectiveness of the sharing set 202 presented to the user.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit including processor configured to:
determine a sharing context for representing a scenario surrounding sharing of a content;
determine a user's past sharing selection for the sharing context, wherein the user's past sharing selection is for representing prior sharing of previous information similar to the content or associated with same instance of the sharing context;
calculate a personalization degree for representing a match between a current personalization setting and the sharing context;
generate a sharing option for the sharing context based on a default set for the sharing context, the user's past sharing selection for the sharing context, and the personalization degree for the sharing context;
estimate a user's privacy preference based on the sharing option; and
a memory, coupled to the control unit, configured to store the user's privacy preference.

2. The system as claimed in claim 1 wherein the control unit is configured to:
receive the user's past sharing selection from a sharing set with the sharing option for the sharing context;
determine a deviation of the user's past sharing selection from the default set; and
adjust the personalization degree based on the deviation for the sharing context.

3. The system as claimed in claim 1 wherein the control unit is configured to:
calculate a priority score for the sharing option; and
estimate the user's privacy preference based on the sharing option includes providing a sharing set with the sharing option ranked with the priority score.

4. The system as claimed in claim 1 wherein the control unit is configured to:
detect a context change for the sharing context; and
change the default set for the context change.

5. The system as claimed in claim 1 wherein the control unit is configured to:
provide a sharing set with the sharing option;
receive the user's past sharing selection over a time period;
calculate a default match for the user's past sharing selection with the default set;
calculate a personalization match for the user's past sharing selection with the sharing set;
generate an adjustment rate for the personalization degree based on the default match and the personalization match; and
adjust the personalization degree based on the adjustment rate.

6. The system as claimed in claim 1 wherein the control unit is configured to:
provide a sharing set with the sharing option; and
detect a user's past sharing selection different from the sharing set.

7. The system as claimed in claim 1 wherein the control unit is configured to:
 select a default option for the sharing context;
 rank the default option in the default set; and
 provide the default set including a top ranked sharing option from the default option.

8. The system as claimed in claim 1 wherein the control unit is configured to:
 determine the sharing context based on a current environment; and
 generate the sharing option for the sharing context includes generating the sharing option based on a sharing target's proximity to a user's location.

9. The system as claimed in claim 1 wherein the control unit is configured to:
 calculate a priority score for the sharing option and the sharing context based on a default match score for the sharing option, a user's match score for the sharing option, and the personalization degree; and
 provide a sharing set with the sharing option ranked based on the priority score.

10. The system as claimed in claim 1 wherein the control unit is configured to determine the sharing context based on a user's location, a current time, a current environment, or a combination thereof.

11. A method of operation of a computing system comprising:
 determining a sharing for representing a scenario surrounding sharing of a content;
 determine a user's past sharing selection for the sharing context, wherein the user's past sharing selection is for representing prior sharing of previous information similar to the content or associated with same instance of the sharing context;
 calculate a personalization degree for representing a match between a current personalization setting and the sharing context;
 generating with a control unit a sharing option for the sharing context based on a default set for the sharing context, the user's past sharing selection for the sharing context, and the personalization degree for the sharing context; and
 estimating a user's privacy preference based on the sharing option.

12. The method as claimed in claim 11 further comprising:
 receiving the user's past sharing selection from a sharing set with the sharing option for the sharing context;
 determining a deviation of the user's past sharing selection from the default set; and
 adjusting the personalization degree based on the deviation for the sharing context.

13. The method as claimed in claim 11 further comprising:
 calculating a priority score for the sharing option; and
wherein:
 estimating the user's privacy preference based on the sharing option includes providing a sharing set with the sharing option ranked with the priority score.

14. The method as claimed in claim 11 wherein:
 determining the sharing context includes detecting a context change for the sharing context; and
further comprising:
 changing the default set for the context change.

15. The method as claimed in claim 11 wherein:
 estimating the user's privacy preference based on the sharing option includes providing a sharing set with the sharing option;
further comprising:
 receiving the user's past sharing selection over a time period;
 calculating a default match for the user's past sharing selection with the default set;
 calculating a personalization match for the user's past sharing selection with the sharing set;
 generating an adjustment rate for the personalization degree based on the default match and the personalization match; and
 adjusting the personalization degree based on the adjustment rate.

16. The method as claimed in claim 11 further comprising:
 estimating the user's privacy preference based on the sharing option includes providing a sharing set with the sharing option; and
 detecting the user's past sharing selection different from the sharing set.

17. The method as claimed in claim 11 further comprising:
 selecting a default option for the sharing context;
 ranking the default option in the default set; and
 providing the default set having a top ranked sharing option from the default option.

18. The method as claimed in claim 11 wherein:
 determining the sharing context includes determining the sharing context based on a current environment; and
 generating the sharing option for the sharing context includes generating the sharing option based on a sharing target's proximity to a user's location.

19. The method as claimed in claim 11 further comprising:
 calculating a priority score for the sharing option and the sharing context based on a default score for the sharing option, a user's matching score for the sharing option, and the personalization degree; and
wherein:
 estimating the user's privacy preference based on the sharing option includes providing a sharing set with the sharing option ranked based on the priority score.

20. The method as claimed in claim 11 wherein determining the sharing context includes determining the sharing context based on a user's location, a current time, a current environment, or a combination thereof.

* * * * *